US005952093A

United States Patent [19]
Nichols et al.

[11] Patent Number: 5,952,093
[45] Date of Patent: Sep. 14, 1999

[54] POLYMER COMPOSITE COMPRISING A INORGANIC LAYERED MATERIAL AND A POLYMER MATRIX AND A METHOD FOR ITS PREPARATION

[75] Inventors: Kevin L. Nichols, Midland, Mich.; Chai-Jing Chou, Missouri City, Tex.

[73] Assignee: The Dow Chemical Company, Midland, Mich.

[21] Appl. No.: 08/803,566

[22] Filed: Feb. 20, 1997

[51] Int. Cl.$^6$ ........................................................ B32B 5/16
[52] U.S. Cl. ..................... 428/323; 428/328; 428/331; 428/407; 428/423.1; 428/425.9; 428/689; 428/696; 428/702; 428/704
[58] Field of Search .................... 428/402, 403, 428/407, 323, 331, 328, 689, 696, 702, 704

[56] References Cited

U.S. PATENT DOCUMENTS

| | | |
|---|---|---|
| 3,227,666 | 1/1966 | Showalter et al. . |
| 3,625,872 | 12/1971 | Ashikia ..................................... 260/2.5 |
| 3,979,198 | 9/1976 | Bardsley et al. .............................. 71/1 |
| 4,365,030 | 12/1982 | Oswald et al. ........................... 523/508 |
| 4,528,235 | 7/1985 | Sacks et al. ............................. 428/220 |
| 4,628,528 | 12/1986 | Sacks et al. ............................. 428/216 |
| 4,739,007 | 4/1988 | Okada et al. ............................ 524/789 |
| 4,810,734 | 3/1989 | Kawasumi et al. ...................... 523/216 |
| 4,874,728 | 10/1989 | Eilliott et al. ............................ 501/148 |
| 4,889,885 | 12/1989 | Usuki et al. ............................. 524/445 |
| 4,894,411 | 1/1990 | Okada et al. ............................ 524/710 |
| 5,032,546 | 7/1991 | Giannelis et al. .......................... 501/3 |
| 5,094,775 | 3/1992 | Bailey et al. ............................ 252/182 |
| 5,346,963 | 9/1994 | Hughes et al. ........................... 525/285 |
| 5,385,776 | 1/1995 | Maxfield et al. ........................ 428/297 |
| 5,527,871 | 6/1996 | Tani et al. ................................. 528/10 |
| 5,552,469 | 9/1996 | Beall et al. .............................. 524/445 |
| 5,698,624 | 12/1997 | Beall et al. .............................. 524/445 |
| 5,726,113 | 3/1998 | Pinnavaia et al. ......................... 502/62 |
| 5,747,560 | 5/1998 | Christiani et al. ....................... 523/209 |
| 5,760,106 | 6/1998 | Pinnavaia et al. ....................... 523/209 |
| 5,760,121 | 6/1998 | Beall et al. .............................. 524/450 |
| 5,853,886 | 12/1998 | Pinnavaia et al. ....................... 428/403 |

FOREIGN PATENT DOCUMENTS

| | | |
|---|---|---|
| 0 352 042 | 1/1990 | European Pat. Off. . |
| 0 358 415 | 3/1990 | European Pat. Off. . |
| 0 398 551 | 11/1990 | European Pat. Off. . |
| 93/04117 | of 1993 | WIPO . |
| 93/04118 | of 1993 | WIPO . |
| 93/11190 | of 1993 | WIPO . |
| 95/06090 | of 1995 | WIPO . |

OTHER PUBLICATIONS

Abstract of J51109998–A (Sep. 1976).
Abstract of J02208358–A (Aug. 1990).
Vaia et al., "Interlayer Structure and Molecular Environment of Alkylammonium Layered Silicates", *Chem. Mater.*, 1994, 6, pp. 1017–1022.
Kurauchi et al., "Nylon 6–Clay Hybrid–Synthesis, Properties and Application to automotive Timing Belt Cover," *SAE Technical Paper Series,* 910584. (1991).
Sumitomo Corporation, Sumitomo Corp. to Build New Firm For Fine Chemicals In U.S., Jun. 15, 1989, p. 7.
Fukushima et al., "Synthesis of an Intercalated Compound of Montmorillonite and 6–Polyamide," *Journal of Inclusion Phenomena 5,* 5 1987, pp. 473–482.
Vaia et al., "Synthesis and Properties of Two–Dimensional Nanostructures by Direct Intercalation of Polymer Melts in Layered Silicates," *Chem. Mater.,* vol. 5, No. 12, 1993.
Fukushima, et al., "Swelling Behaviour of Montmorillonite By Poly–6–Amide," *Clay Minerals,* 23, 1988, pp. 27–34.

*Primary Examiner*—Hoa T. Le
*Attorney, Agent, or Firm*—Philip D Shepherd; Susan M Zerull

[57] ABSTRACT

A polymer composite comprises a polymer matrix having, dispersed therein, layers of an inorganic material derived from a multilayered inorganic material such as clay intercalated with an inorganic intercalant. The multilayered inorganic material may also be intercalated with an organic material.

20 Claims, No Drawings ary (April 1991), 447-448; and Japan Kokai 76,109,998.

POLYMER COMPOSITE COMPRISING A INORGANIC LAYERED MATERIAL AND A POLYMER MATRIX AND A METHOD FOR ITS PREPARATION

BACKGROUND OF THE INVENTION

The present invention relates to a composite comprising a polymer and an inorganic additive, more specifically, layers of a swellable material, and to a method for preparing the polymer composite.

Polymer composites comprising a polymer matrix having one or more additives such as a particulate or fiber material dispersed throughout the continuous polymer matrix are well known. The additive is often added to enhance one or more properties of the polymer.

Useful additives include inorganic layered materials such as talc, clays and mica of micron size.

A number of techniques have been described for dispersing the inorganic layered material into a polymer matrix. It has been suggested to disperse individual layers, e.g., platelets, of the layered inorganic material, throughout the polymer. However, without some additional treatment, the polymer will not infiltrate into the space between the layers of the additive sufficiently and the layers of the layered inorganic material will not be sufficiently uniformly dispersed in the polymer.

To provide a more uniform dispersion, as described in U.S. Pat. No. 4,889,885, sodium or potassium ions normally present in natural forms of mica-type silicates and other multilayered particulate materials are exchanged with organic cations (e.g., alkylammonium ions or suitably functionalized organosilanes) thereby intercalating the individual layers of the multilayered materials, generally by ionic exchange of sodium or potassium ions. This intercalation can render the normally hydrophilic mica-type silicates organophilic and expand its interlayer distance. Subsequently, the layered material (conventionally referred to as "nanofillers") is mixed with a monomer and/or oligomer of the polymer and the monomer or oligomer polymerized. The intercalated silicate is described as having a layer thickness of 7 to 12 Å and an interlayer distance of 30 Å or above.

In WO 93/11190, an alternative method for forming a composite is described in which an intercalated layered, particulate material having reactive organosilane compounds is dispersed in a thermoplastic polymer or vulcanizable rubber.

Yet additional composites containing these so-called nanofillers and/or their methods of preparation are described in U.S. Pat. Nos. 4,739,007; 4,618,528; 4,528,235; 4,874,728; 4,889,885; 4,810,734; 4,889,885; 4,810,734; and 5,385,776; German Patent 3808623; Japanese Patent J02208358; European Patent applications 0,398,551; 0,358,415; 0,352,042; and 0,398,551; and J. Inclusion Phenomena 5, (1987), 473 ?483; Clay Minerals, 23, (1988), 27; Polym. Preprints, 32 (April 1991), 65–66; Polym. Prints, 28, (August 1987), 447–448; and Japan Kokai 76,109,998.

However, even with these numerous described composites and methods, it still remains desirable to have an improved composite and method for forming polymer composites derived from a multilayered additive to make composites having improved properties over the polymer alone.

SUMMARY OF THE INVENTION

Accordingly, in one aspect, the present invention is a composite comprising a polymer matrix having, dispersed therein, delaminated or exfoliated particles derived from a multilayered inorganic material intercalated with an inorganic intercalant. Optionally, an organic intercalant can also be employed. If employed, the optionally employed organic intercalant can be calcined or at least partially removed from the multilayered inorganic material.

In another aspect, the present invention is a composite comprising a polymer matrix having dispersed therein delaminated or exfoliated particles derived from a multilayered material which has been intercalated with an organic intercalant only which is subsequently calcined or otherwise at least partially removed from the layered, reinforcing material.

In a third aspect, the present invention is a method for forming a composite which method comprises contacting a polymer or a precursor to the polymer with a multilayered inorganic particulate material intercalated with an inorganic polymeric intercalant and, optionally, an organic intercalant. If the optionally employed organic intercalant is used, it can be calcined or at least partially removed from the multilayered inorganic material prior to mixing the material with the polymer.

In a preferred embodiment, the polymer is a melt processible, thermoplastic polymer and the method comprises mixing the polymer and intercalated material at conditions to disperse the intercalated material into the polymer.

The polymeric compositions of this invention can exhibit an excellent balance of properties and can exhibit one or more superior properties such as improved heat or chemical resistance, ignition resistance, superior resistance to diffusion of polar liquids and of gases, yield strength in the presence of polar solvents such as water, methanol, ethanol and the like, or enhanced stiffness and dimensional stability, as compared to composites which contain the same multilayered material which has not previously been intercalated or where no intercalated material is employed.

The composites of the present invention are useful in a wide variety of applications including transportation (e.g., automotive and aircraft) parts, electronics, business equipment such as computer housings, building and construction materials, and packaging materials.

DETAILED DESCRIPTION OF THE INVENTION

In the present invention, the polymer matrix of the composite can be essentially any normally solid polymer, including both thermoset and thermoplastic polymers and vulcanizable and thermoplastic rubbers.

A representative thermoplastic polymer which can be employed to prepare the composites of the present invention is a thermoplastic polyurethane such as derived from the reaction of a diisocyanate such as 1,5-naphthalene diisocyanate, 3,3'-dimethyl-4,4'-diphenylmethane diisocyanate, 4,4'-diphenyliso-propylidene diisocyanate, 4,4'-diisocyanatodiphenylmethane and the like and linear long-chain diol such as poly(tetramethylene adipate), poly (ethylene succinate), polyether diol and the like.

Another representative thermoplastic polymer is a polycarbonate such as prepared by the reaction of an aromatic polyol (e.g., resorcinol, catechol, hydroquinone, a dihydroxynaphthalene, a dihydroxyanthracene, a bis (hydroxyaryl) fluorene, a dihydroxyphenanthrene, a dihydroxybiphenyl; and a bis(hydroxyphenyl) propane), more preferably an aromatic diol, with a carbonate precursor (e.g., carbonic acid derivative, phosgene, haloformate, or carbonate ester such as dimethyl carbonate or diphenyl carbonate, poly(methane bis(4-phenyl) carbonate), poly(1,1-ether bis (4-phenyl)carbonate), and the like.

Yet other representative examples include thermoplastic polymers and copolymers derived from esters of ethylenically unsaturated methacrylic or acrylic acid such as poly (methyl or ethyl)acrylate, poly(methyl or ethyl) methacrylate, including copolymers of methyl methacrylate and a monovinylidene aromatic such as styrene, copolymers of ethylene and ethyl acrylate, methacrylated butadiene-styrene copolymers and the like; polymers derived from ethylenically unsaturated monomers such as polyolefins (e.g., polypropylene and polyethylene including high density polyethylene, linear low density polyethylene, ultra low linear density polyethylene, homogeneously branched, linear ethylene/ α-olefin copolymers, homogeneously branched, substantially linear ethylene/ α-olefin polymers, and high pressure, free radical polymerized ethylene copolymers such as ethylene-acrylic acid (EAA) copolymers), highly branched low density polyethylene, and ethylene-vinyl acetate (EVA) copolymers; polymers of monovinylidene aromatics such as polystyrene and syndiotactic polystyrene including copolymers thereof such as impact modified polystyrene, styrene-ethylene copolymers, styrene-acrylonitrile copolymers, acrylonitrile-butadiene-styrene copolymers and other styrenic copolymers.

Still other representative examples of thermoplastic polymers include polyesters such as poly(ethylene-1,5-naphthalate), poly(1,4-cyclohexane dimethylene terephthalate), poly(ethylene oxybenzoate), poly(para-hydroxy benzoate), polyethylene terephthalate, polybutylene terephthalate and the like; polysulfones such as the reaction product of the sodium salt of 2,2-bis(4-hydroxyphenyl) propane and 4,4'-dichlorodiphenyl sulfone; polyetherimides; and polymers of ethylenically unsaturated nitriles such as polyacrylonitrile; poly(epichlorohydrin); polyoxyalkylenes such as poly(ethylene oxide); poly(furan); cellulose-based plastics such as cellulose acetate, cellulose acetate butyrate; silicone based plastics such as poly (dimethyl siloxane) and poly(dimethyl siloxane co-phenylmethyl siloxane); polyether ether ketones; polyamides such as poly(4-amino butyric acid), poly (hexamethylene adipamide), poly(6-aminohexanoic acid), and poly(2,2,2-tri-methyl hexamethylene terephthalamide); polylactones such as poly(pivalolactone) and poly (caprolactone); poly(aryleno oxides) such as poly(2,6-dimethyl-1,4-phenylene oxide); poly(arylene sulfides) such as poly(phenylene sulfide); polyetherimides; acetals; polyvinyl chloride; poly(vinylidene chloride) and the like and blends of two or more of these polymers.

Preferred thermoplastic polymers include the polymers and copolymers of ethylene and/or propylene, polymers and copolymers of a monovinylidene aromatic compound, more preferably styrene, polycarbonates, and thermoplastic polyurethanes or mixtures thereof. Preferred ethylene polymers and copolymers include linear low density polyethylenes, low density polyethylenes and the homogeneously branched linear and substantially linear ethylene copolymers with a density (ASTM D-792) of about 0.85 to about 0.92 g/cm³, more preferably of about 0.85 to about 0.90 0.92 g/cm³, and a measured melt index (ASTM D-1238 (190/2.16)) of about 0.1 to about 10 g/min; substantially linear, functionalized, ethylene copolymers, particularly a copolymer of ethylene with vinyl acetate containing from about 0.5 to about 50 weight percent units derived from vinyl acetate, are especially preferred, especially copolymers of ethylene with vinyl acetate having a melt index of about 0.1 to about 10 g/10 min; and copolymers of ethylene with acrylic acid containing from about 0.5 to about 25 weight percent units derived from acrylic acid.

Representative vulcanizable and thermoplastic rubbers which may be useful in the practice of the present invention include rubbers such as brominated butyl rubber, chlorinated butyl rubber, polyurethane elastomers, fluoroelatomers, polyester elastomers, butadiene/acrylonitrile elastomers, silicone elastomers, rubbers derived from conjugated dienes such as poly(butadiene), poly(2,3-dimethylbutadiene), poly (butadiene-pentadiene), and poly(isobutylene), ethylene-propylene-diene terpolymer (EPDM) rubbers and sulfonated EPDM rubbers, poly(chloroprene), chlorosulphonated or chlorinated poly(ethylenes), and poly(sulfide) elastomers. Other examples include block copolymers made up of segments of glassy or crystalline blocks such as poly (styrene), poly(vinyl-toluene), poly(t-butyl styrene), polyester and the like and elastomeric blocks such as poly (butadiene), poly(isoprene), ethylene-propylene copolymers, ethylene-butylene copolymers, polyether ester and the like, e.g., poly(styrene)-poly(butadiene)-poly (styrene) block copolymers.

Thermoset resins differ from thermoplastic polymers in that they become substantially infusible or insoluble irreversibly since they are cured (cross-linked) as opposed to the thermoplastics which are typically not cross-linkable and soften when exposed to heat and are capable of returning to original conditions when cooled. Representative examples of thermoset polymers which may be useful in the practice of the present invention include thermoset phenolic resins such as thermosettable resins containing resorcinol, p-tertiary-octylphenol, cresol, alkylated phenolic novalac, phenolic polyvinyl butyral, and phenolic cresol and an aldehyde such as formaldehyde, acetaldehyde or furfural; thermoset polyimide resins such as those curable resins based on pyromellitic dianhydride, 3,3 ',4,4'-benzophenone-carboxylic dianhydride and meta-phenylenediamine; thermoset epoxides or epoxy resins such as the resins containing the reaction product bisphenol A or derivatives thereof, e.g., the diglycidyl ether of bisphenol A, or a polyol such as glycerol with epichlorohydrin and a cross-linking or curing agent such as a polyfunctional amine, e.g., polyalkylenepolyamine; thermoset polyester resins such as the reaction products of an unsaturated dicarboxylic acid such as maleic or fumaric acid (which may be used in combination with a saturated acid such as phthalic or adipic acid) with a dihydric alcohol such as ethylene, propylene, diethylene and dipropylene glycol which cure upon using an ethylenic unsaturated curing agent such as styrene or diallyl phthalate, including thermosettable allyl resins including resins derived from diallyl phthalates, e.g., diallyl orthophthalate, diallyl isophthalate, diallyl fumarates and diallyl maleates; thermoset polyurethanes including those derived from the reaction of a diisocyanate, e.g., toluene diisocyanate, methylene diphenyl diisocyanate, or isophorone diisocyanate, or a polymeric isocyanate with a polyhydric alcohol such as polypropylene glycol and, if required, an additional cross-linking agent such as water; thermoset urea resins; melamine resins, furan resins, and vinyl ester resins including epoxy (meth)acrylates.

Of these polymers, the preferred thermoplastic polymers are polycarbonates, homo- and copolymers of styrene, nylons, polyesters, thermoplastic polyurethanes, and homo- and copolymers of ethylene and propylene; and the preferred thermoset polymers include the epoxy and urethane resins.

The inorganic layered material which may be used as the reinforcing agent can be any swellable material which can be intercalated with an inorganic and an organic intercalant. Representative examples of inorganic layered materials which may be used in the practice of the present invention include phyllosilicates such as montmorillonite, nontronite, beidellite, volkonskoite, hectorite, saponite, sauconite, magadiite, and kenyaite; vermiculite; and the like. Other representative examples include illite minerals such as ledikite; the layered double hydroxides or mixed metal hydroxides such as $Mg_6Al_3.4(OH)_{18}.8(CO_3)1.7H_2O$ (see W. T. Reichle, J. Catal., 94 (1985), 547), which have positively charged layers and exchangeable anions in the interlayer spaces; chlorides such as $ReCl_3$ and FeOCl, chalcogenides such as $TiS_2$, $MoS_2$, and $MoS_3$; cyanides such as $Ni(CN)_2$; and oxides such as $H_2Si_2O_5$, $V_5O_{13}$, $HTiNbO_5$, $Cr0.5V0.5S_2$, $W0.2V_2.8O_7$, $Cr_3O_8$, $MoO_3(OH)_2$, $VOPO_4\cdot 2H_2O$, $CaPO_4CH_3\text{---}H_2O$, $MnHAsO_4\text{---}H_2O$, $Ag_6Mo_{10}O_{33}$, and the like. Other layered materials or multilayer aggregates having little or no charge on the surface of the layers may also be used in this invention provided they can be intercalated with swelling agents which expand their interlayer spacing. Mixtures of one or more such materials may also be employed.

Preferred layered materials are those having charges on the layers and exchangeable ions such as sodium, potassium, and calcium cations, which can be exchanged, preferably by ion exchange, with ions, preferably cations such as ammonium cations, or reactive organosilane compounds, that cause the multi-lamellar or layered particles to delaminate or swell. Typically, the negative charge on the surface of the layered materials is at least about 20 milliequivalents, preferably at least about 50 milliequivalents, and more preferably from about 50 to about 120 milliequivalents, per 100 grams of the multilayered material. Particularly preferred are smectite clay minerals such as montmorillonite, nontronite, beidellite, volkonskoite, hectorite, saponite, sauconite, magadiite, and kenyaite, with hectorite and montmorilonite having from about 20 milliequivalents to about 150 milliequivalents per 100 grams material being more preferred. Most preferred layered materials are phyllosilicates.

The multilayered material may be intercalated with an inorganic intercalant and an organic intercalant. The inorganic intercalant can be an inorganic polymeric substance or an inorganic solid having a colloidal particle size. Representative polymeric substances are substances obtained by hydrolyzing a polymerizable metallic alcoholate such as $Si(OR)_4$, $Al(OR)_3$, $Ge(OR)_4$, $Si(OC)_2H_5)_4$, $Si(OCH_3)_4$, $Ge(OC_3H_7)$, $Ge(OC_2H_5)_4$ or the like, either alone or in combination. Representative colloidal sized particles of an inorganic compound which can be used include the colloidal sized particles of the hydrolyzed form of $SiO_2$ (e.g., Si(OH) or silica sol), $Sb_2O_3$, $Fe_2O_3$, $Al_2O_3$, $TiO_2$, $ZrO_2$ and $SnO_2$ alone or in any combination. Most preferably, the grain size of the colloidal inorganic should preferably be in a range of from about 5, more preferably from about 10, most preferably from about 20, to about 250, more preferably about 120 Å.

While it may be possible to intercalate the unmodified form of the inorganic material between the layers of the multilayered particulate material, the inorganic intercalant is preferably modified at its surface by a cationic inorganic compound or a metallic alcoholate different than the polymerizable metallic alcoholate. Representative cationic inorganic compounds which may be used to surface treat the inorganic intercalant are titanium compounds, zirconium compounds, hafnium compounds, iron compounds, copper compounds, chromium compounds, nickel compounds, zinc compounds, aluminum compounds, manganese compounds, phosphorus compounds, and boron compounds. Metallic chlorides such as $TiCl_4$, metallic oxychlorides such as $ZrCOCl_2$, and nitrate chloride are preferred. Representative metallic alcoholates which can be used to the treat the surface of the inorganic intercalant are $Ti(OR)_4$, $Zr(OR)_4$, $PO(OR)_3$, $B(OR)_3$ and the like alone or combination, with $Ti(OC_3H_7)_4$, $Zr(OC_3H_7)_4$, $PO(OCH_3)_3$, $PO(OC_2H_5)_3$, $B(OCH_3)_3$, $B(OC_2H5)_3$ being preferred.

The organic intercalant can be any organic material which displaces, totally or in part, the ions originally on the surface of the multilayered material. In general, the intercalant contains a functional group which interacts with the negative charges on the surface of that material. In addition, the intercalant preferably also contains a functional group reactive with the matrix polymer or possesses some property such as cohesive energy, a capacity for dispersive, polar, or hydrogen-bonding interactions or other specific interactions, such as acid/base or Lewis-acid/Lewis-base interactions, to promote the intermingling ("compatibility") of the matrix polymer and multilayered material.

The organic intercalant can be a water soluble polymer, a reactive organosilane compound, an onium compound such as an ammonium, phosphonium or sulfonium salt, an amphoteric surface active agent, a choline compound, or the like.

Representative examples of water-soluble polymers which can be employed as the organic intercalant in the practice of this invention are water soluble polymers of vinyl alcohol (e.g., poly(vinyl alcohol); polyalkylene glycols such as polyethylene glycol; water soluble cellulosics polymers such methyl cellulose and carboxymethyl cellulose, the polymers of ethylenically unsaturated carboxylic acids such as poly(acrylic acid), and their salts, polyvinyl pyrrolidone and the like.

Representative examples of onium compounds include quaternary ammonium salts (cationic surface active agents) having octadecyl, hexadecyl, tetradecyl, dodecyl or like moieties; with preferred quaternary ammonium salts including octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt and the like.

Representative examples of the amphoteric surface-active agent which can be employed in this invention include surfactants having an aliphatic amine cationic moiety and a carboxyl, sulfate, sulfone or phosphate as the anionic moiety. Representative examples of choline compounds include $[HOCH_2CH_2N(CH_3)_3]+OH\text{---}$, $C_5H_{14}ClNO$, $C_5H_{14}NOC_4H_5O_6$, $C_5H_{14}NOC_6H_7O_7$, $C_5H_{14}NOC_6H_{12}O_7$ and the like.

Representative examples of organosilane compounds include silane agents of the formula:

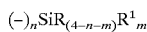

where (-) is a covalent bond to the surface of the layered material, m is 0, 1 or 2; n is 1, 2 or 3 with the proviso that the sum of m and n is equal to 3; $R^1$ is a nonhydrolyzable organic radical (including alkyl, alkoxyalkyl, alkylaryl, arylalkyl, alkoxyaryl) and is not displaceable during the formation of the composite; R is the same or different at each occurrence and is an organic radical which is not hydrolyzable and displaceable during the formation of the composite which is reactive with the polymer matrix or at least one monomeric component of the polymer. Representative R groups include amino, carboxy, acylhalide, acyloxy, hydroxy, isocyanato ureido, halo, epoxy, epichlorohydryl and the like. Preferred organosilane intercalants include long chain branched quaternary ammonium salts and/or suitably functionalized organosilane compounds, as disclosed in WO 93/11190, pages 9–21, which are incorporated herein by reference.

Organic materials other than those described can also be employed as the organic intercalants provided they can be intercalated between the layers of the multilayered particulate material and subsequently degraded such as by calcination to at least partially remove the intercalant and leave gaps between the layers.

In the practice of the present invention, the multilayered particulate material is intercalated with the inorganic, if employed, and organic intercalants. While the method of intercalation is not particularly critical, in one embodiment of the present invention, prior to intercalating the multilayered material, it is swollen in an aqueous or organic liquid. Any aqueous or organic liquid capable of swelling the multilayered material being intercalated can be employed. By aqueous liquid it is meant water, including acids and bases as well as some salt solutions. In addition, solutions of water and one or more water-miscible organic liquids such as the lower alkyl alcohols, e.g., methanol and butanol, can be employed. Representative examples of organic liquids which can be employed include dimethylformamide, dimethylsulfone, halogenated hydrocarbons, e.g., methylene chloride, or a liquid hydrocarbon, preferably having from about 4 to about 15 carbon atoms, including aromatic and aliphatic hydrocarbons or mixtures thereof such as heptane, benzene, xylene, cyclohexane, toluene, mineral oils and liquid paraffins, e.g., kerosene and naphtha. The polymerizable inorganic intercalant is formed as a solution in a suitable solvent such as ethyl alcohol, isopropyl alcohol and the like and subsequently hydrolyzed, preferably in the presence of the multilayered material. For example, a mixture of the multilayered material, swollen in an appropriate swelling material, and the polymerizable inorganic intercalant can be contacted with a hydrolyzing agent for the polymerizable intercalant to form the inorganic polymer. In general, the hydrolyzation is conducted at a temperature above about 70° C. Subsequent to partial or complete polymerization, the organic intercalant can be added. The organic intercalant reacts upon the hydrolyzed surfaces of the layered material.

In the event a colloidal inorganic intercalant is used the organic intercalant can be added to a dispersion of the colloidal inorganic intercalant. Subsequently, the reaction product of the organic intercalant with the inorganic intercalant is mixed with the swollen multilayered material. While the conditions of such intercalation may vary, in general, it is advantageously conducted at a temperature of from about 30° C. to about 100° C., more advantageously from about 60° C. to 70° C.

Following intercalation, the intercalated multilayered filler can be dehydrated by conventional means such as centrifugal separation and then dried. While drying conditions most advantageously employed will be dependent on the specific intercalant and multilayered particulate material employed, in general, drying is conducted at temperatures of at least about 40° C. to about 100° C. and more advantageously at a temperature of about 50° C to about 80° C. by any conventional means such as a hot air oven. The organic intercalant can then optionally be calcined such as by heating to about 300° C. to about 600° C., preferably from about 450° C. to about 550° C.

In another embodiment of the present invention, the organic intercalant can be employed to intercalate the multilayered particulate material but the inorganic intercalant is not employed. In this embodiment, the organic intercalant is calcined such as by heating to about 300° C. to about 600° C., preferably from about 450° C. to about 550° C.

Following intercalation and, if conducted, calcination, the intercalant in the multilayered material forms a layer of charge opposite to the charge on the surface of the layers of the multilayered particles with the interlayer spacing being dependent on the intercalants employed and whether the organic intercalant has been calcined or otherwise partially or totally removed. In general, the inter-layer spacing (i.e., distance between the faces of the layers as they are assembled in the intercalated material) is from about 5 to 600 Å (as determined by X-ray diffraction) whereas prior to intercalation the interlayer spacing is usually equal to or less than about 4 Å. This increase in interlayer spacing permits greater penetration of the polymer matrix into the filler. Preferably, the interlayer spacing of the intercalated filler is at least about 8 Å, more preferably at least about 12 Å and less than about 100 Å, more preferably less than about 30 Å.

Following preparation of the intercalated multilayered material, the intercalated, multilayered material and matrix polymer are combined to form the desired composite.

The amount of the intercalated multilayered material most advantageously incorporated into the polymer matrix is dependent on a variety of factors including the specific intercalated material and polymer used to form the composite as well as its desired properties. Typical amounts can range from about 0.001 to about 90 weight percent of the intercalated, layered material based on the weight of the total composite. Generally, the composite comprises at least about 0.1, preferably about 1, more preferably about 2, and most preferably about 4 weight percent and less than about 60, preferably about 50, more preferably about 45 and most preferably about 40 weight percent of the intercalated, layered material based on the total weight of the composite.

The intercalated, layered material can be dispersed in the monomer(s) which form the polymer matrix and the monomer(s) polymerized in situ or alternatively, can be dispersed in the polymer, in melted or liquid form.

Melt blending is one method for preparing the composites of the present invention, particularly when forming the composite from a thermoplastic polymer. Techniques for melt blending of a polymer with additives of all types are known in the art and can typically be used in the practice of this invention. Typically, in a melt blending operation useful in the practice of the present invention, the polymer is heated to a temperature sufficient to form a polymer melt and combined with the desired amount of the intercalated, multilayered material in a suitable mixer, such as an extruder, a Banbury Mixer, a Brabender mixer, a continuous mixer and the like.

In the practice of the present invention, the melt blending is preferably carried out in the absence of air, such as in the presence of an inert gas, such as argon, neon, nitrogen or the like. The melt blending operation can be conducted in a batch or discontinuous fashion but is more preferably conducted in a continuous fashion in one or more processing zones such as in an extruder from which air is largely or completely excluded. The extrusion can be conducted in one zone or step or in a plurality of reaction zones in series or parallel.

Alternatively, the matrix polymer may be granulated and dry mixed with the intercalated, multilayered material, and thereafter, the composition heated in a mixer until the polymer is melted to form a flowable mixture. This flowable mixture can then be subjected to a shear in a mixer sufficient to form the desired composite. This type of mixing and composite preparation is advantageously employed to prepare composites from both thermoplastic and thermoset polymers.

A polymer melt containing the intercalated, multilayered particulate material may also be formed by reactive melt processing in which the intercalated, multilayered material is initially dispersed in a liquid or solid monomer or cross-linking agent which will form or be used to form the polymer matrix of the composite. This dispersion can be injected into a polymer melt containing one or more polymers in an extruder or other mixing device. The injected liquid may result in new polymer or in chain extension, grafting or even cross-linking of the polymer initially in the melt.

Methods for preparing a composite using in situ type polymerization are also known in the art and reference is made thereto for the purposes of this invention. In applying this technique to the practice of the present invention, the composite is formed by mixing monomers and/or oligomers with the intercalated, multilayered material and subsequently polymerizing the monomer and/or oligomers to form the polymer matrix of the composite.

The intercalated, multilayered material is advantageously dispersed under conditions such that at least about 80, preferably at least about 85, more preferably at least about 90, and most preferably at least about 95, weight percent of the layers of the intercalated, multilayered, material delaminate to form individual layers dispersed in the polymer matrix. These layers may be platelet particles having two relatively flat or slightly curved opposite faces where the distance between the faces is relatively small compared to the size of the faces, or needle-like particles. It is quite probable that the layers of the filler will not delaminate completely in the polymer, but will form layers in a coplanar aggregate. These layers are advantageously sufficiently dispersed or exfoliated in the matrix polymer such that at least 80 percent of the layers are in small multiples of less than about 10, preferably less than about 5, and more preferably less than about 3, of the layers.

The dimensions of the dispersed delaminated layers may vary greatly, but in the case of particles derived from clay minerals, the particle faces are roughly hexagonal, circular, elliptical, or rectangular and exhibit maximum diameters or length from about 50 to about 2,000 Å. As such, the aspect ratio of length/thickness ranges from about 10 to about 2,000. The aspect ratio which is most advantageously employed will depend on the desired end-use properties. The particle faces may also be needle-like.

Optionally, the composites of the present invention may contain various other additives such as nucleating agents, other fillers, lubricants, plasticizers, chain extenders, colorants, mold release agents, antistatic agents, pigments, fire retardants, and the like. The optional additives and their amounts employed are dependent on a variety of factors including the desired end-use properties.

The composites of this invention exhibit useful properties. For example, they may exhibit enhanced yield strength and tensile modulus, even when exposed to polar media such as water or methanol; enhanced heat resistance and impact strength; improved stiffness, wet-melt strength, dimensional stability, and heat deflection temperature, and decreased moisture absorption, flammability, and permeability as compared to the same polymers which contain the same multilayered material which has not previously been intercalated or where no intercalated material is employed. Improvements in one or more properties can be obtained even though small amounts of intercalated multilayered materials are employed.

The properties of the composites of the present invention may be further enhanced by post-treatment such as by heat treating or annealing the composite at an elevated temperature, conventionally from about 80° C. to about 230° C. Generally, the annealing temperatures will be more than about 100° C., preferably more than about 110° C., and more preferably more than about 120° C., to less than about 250° C., preferably less than about 220° C., and more preferably less than 180 ° C.

The composites of the present invention can be molded by conventional shaping processes such as melt spinning, casting, vacuum molding, sheet molding, injection molding and extruding. Examples of such molded articles include components for technical equipment, apparatus castings, household equipment, sports equipment, bottles, containers, components for the electrical and electronics industries, car components, and fibers. The composites may also be used for coating articles by means of powder coating processes or as hot-melt adhesives.

The composite material may be directly molded by injection molding or heat pressure molding, or mixed with other polymers. Alternatively, it is also possible to obtain molded products by performing the in situ polymerization reaction in a mold.

The molding compositions according to the invention are also suitable for the production of sheets and panels using conventional processes such as vacuum or hot-pressing. The sheets and panels can be used to coat materials such as wood, glass, ceramic, metal or other plastics, and outstanding strengths can be achieved using conventional adhesion promoters, for example, those based on vinyl resins. The sheets and panels can also be laminated with other plastic films such as by coextrusion, the sheets being bonded in the molten state. The surfaces of the sheets and panels, can be finished by conventional methods, for example, by lacquering or by the application of protective films.

The composites of this invention are also useful for fabrication of extruded films and film laminates, as for example, films for use in food packaging. Such films can be fabricated using conventional film extrusion techniques. The films are preferably from about 10 to about 100, more preferably from about 20 to about 100, and most preferably from about 25 to about 75, microns thick.

What is claimed is:

1. A composite comprising a polymer matrix having, dispersed therein, an inorganic layered material intercalated with an organic intercalant and an ionic or non-ionic inorganic intercalant.

2. The composite of claim 1 wherein the polymer matrix is a thermoset or thermoplastic polymer or a vulcanizable or thermoplastic rubber.

3. The composite of claim 2 wherein the polymer matrix is a thermoplastic polymer of a polymer or copolymer of ethylene, propylene; a monovinylidene aromatic; a polycarbonate; or a thermoplastic polyurethane or mixtures thereof.

4. The composite of claim 3 wherein the polymer matrix is a linear low density polyethylene, a low density polyethylene or the homogeneously branched linear and substantially linear ethylene copolymers with a density of from about 0.85 to about 0.92 g/cm$^3$ and a melt index from about 0.1 to about 10 g/min; substantially linear, functionalized, ethylene copolymers.

5. The composite of claim 2 wherein the polymer matrix is a thermoset resin.

6. The composite of claim 5 wherein the thermoset resin is a thermoset phenolic resin; a thermoset epoxide or epoxy resin; a thermoset polyester resin; a thermoset polyurethane; a thermoset urea resin; melamine resin, furan resin, or vinyl ester resin.

7. The composite of claim 6 where in the thermoset resin is an epoxy or urethane resin.

8. The composite of claim 1 wherein the inorganic layered material is a phyllosilicate; an illite mineral, a layered double hydroxide or mixed metal hydroxide, $ReCl_3$ and $FeOCl$; $TiS_2$, $MoS_2$, $MoS_3$; $Ni(CN)_2$; $H_2Si_2O_5$, $V_5O_{13}$, $HTiNbO_5$, $Cr0.5V0.5S_2$, $W0.2V_2.8O_7$, $Cr_3O_8$, $MoO_3(OH)_2$, $VOPO_4 \cdot 2H_2O$, $CaPO_4CH_3$—$H_2O$, $MnHAsO_4$—$H_2O$, or $Ag_6Mo_{10}O_{33}$.

9. The composite of claim 8 wherein the inorganic layered material is montmorillonite, nontronite, beidellite, volkonskoite, hectorite, saponite, sauconite, magadiite, or kenyaite.

10. The composite of claim 8 wherein the inorganic layered material is a phyllosilicate.

11. The composite of claim 1 wherein the inorganic intercalant is an inorganic polymeric substance obtained by hydrolyzing a polymerizable metallic alcoholate or a colloidal compound.

12. The composite of claim 11 wherein the inorganic intercalant is a polymeric substance which is the hydrolyzed product of $Si(OR)_4$, $Al(OR)_3$, $Ge(OR)_4$, $Si(OC_2H_5)_4$, $Si(OCH_3)_4$, $Ge(OC_3H_7)$, $Ge(OC_2H_5)_4$ or a mixture thereof.

13. The composite of claim 11 wherein the inorganic intercalant is colloidal sized particle of the hydrolyzed form of $SiO_2$, $Sb_2O_3$, $Fe_2O_3$, $Al_2O_3$, $TiO_2$, $ZrO_2$ and $SnO_2$ or a mixture thereof.

14. The composite of claim 13 wherein the inorganic intercalant has a grain size of the colloidal inorganic is from about 5 to about 250 Å.

15. The composite of claim 11 wherein the inorganic intercalant is modified at its surface by a cationic inorganic compound or a metallic alcoholate different than the polymerizable metallic alcoholate.

16. The composite of claim 15 wherein the cationic inorganic is a metallic chloride; a metallic oxychloride, a nitrate chloride, $Ti(OC_3H_7)_4$, $Zr(OC_3H_7)_4$, $PO(OCH_3)_3$, $PO(OC_2H_5)_3$, $B(OCH_3)_3$, or $B(OC_2H_5)_3$.

17. The composite of claim 1 wherein the organic intercalant is a water-soluble polymer, a reactive organosilane, an ammonium, phosphonium or sulfonium salt, an amphoteric surface active agent or a chlorine compound.

18. The composite of claim 1 wherein the organic intercalant is calcined.

19. A composite comprising a polymer matrix having, dispersed therein, a layered inorganic filler intercalated with an organic intercalant which is subsequently calcined or otherwise removed from the layered inorganic filler.

20. The composite of claim 19 wherein the organic intercalant is a water soluble polymer of vinyl alcohol; polyalkylene glycol; water soluble cellulosic polymer; a polymer of an ethylenically unsaturated carboxylic acid or its salt; polyvinyl pyrrolidone; a quaternary ammonium salt; an amphoteric surface-active agent having an aliphatic amine cationic moiety and a carboxyl, sulfate, sulfone or phosphate anionic moiety; $[HOCH_2CH_2N(CH_3)_3]+OH^-$, $C_5H_4ClNO$, $C_5H_{14}NOC_4H_5O_6$, $C_5H_{14}NOC_6H_7O_7$, $C_5H_{14}NOC_6H_{12}O_7$; or

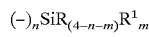

$$(-)_n SiR_{(4-n-m)} R^1_m$$

where (–) is a covalent bond to the surface of the layered material, m is 0, 1 or 2; n is 1, 2 or 3 with the proviso that the sum of m and n is equal to 3; $R^1$ is a nonhydrolyzable organic radical and is not displaceable during the formation of the composite; R is the same or different at each occurrence and is an organic radical which is not hydrolyzable and displaceable during the formation of the composite which is reactive with the polymer matrix or at least one monomeric component of the polymer.

* * * * *

UNITED STATES PATENT AND TRADEMARK OFFICE
CERTIFICATE OF CORRECTION

PATENT NO.    : 5,952,093
DATED         : September 14, 1999
INVENTOR(S)   : Kevin L. Nichols and Chai-Jing Chou It is certified that error appears in the above-indentified patent and that said Letters Patent is hereby corrected as shown below:

Column 12, Claim 20, line 22 "[HOCH$_2$CH$_2$N(CH$_3$)$_3$]+OH" should correctly read -- [HOCH$_2$CH$_2$N(CH$_3$)$_3$]+OH- --

Signed and Sealed this

Twenty-seventh Day of March, 2001

Attest:

NICHOLAS P. GODICI

Attesting Officer

Acting Director of the United States Patent and Trademark Office